US007672875B2

(12) United States Patent
Keohane et al.

(10) Patent No.: US 7,672,875 B2
(45) Date of Patent: Mar. 2, 2010

(54) PRESENTING AN ALTERNATIVE PRODUCT PACKAGE OFFER FROM A WEB VENDOR

(75) Inventors: Susann M. Keohane, Austin, TX (US);
Gerald F. McBrearty, Austin, TX (US);
Shawn P. Mullen, Buda, TX (US);
Jessica Murillo, Hutto, TX (US);
Johnny M. Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1302 days.

(21) Appl. No.: 11/146,477

(22) Filed: Jun. 6, 2005

(65) Prior Publication Data
US 2006/0277118 A1 Dec. 7, 2006

(51) Int. Cl.
*G06Q 30/00* (2006.01)
(52) U.S. Cl. .......................... 705/26; 705/27
(58) Field of Classification Search .................. 705/26, 705/27
See application file for complete search history.

(56) References Cited

U.S. PATENT DOCUMENTS

| 5,870,717 | A | 2/1999 | Wiecha | 705/26 |
| 5,987,423 | A | 11/1999 | Arnold et al. | 705/14 |
| 6,014,637 | A | 1/2000 | Fell et al. | 705/26 |
| 6,138,105 | A * | 10/2000 | Walker et al. | 705/10 |
| 6,246,997 | B1 | 6/2001 | Cybul et al. | 705/27 |
| 6,415,261 | B1 | 7/2002 | Cybul et al. | 705/14 |
| 6,574,607 | B1 | 6/2003 | Carter et al. | 705/26 |

(Continued)

OTHER PUBLICATIONS

Crane, Daniel; Multiproduct Discounting: A Myth of Nonprice Predation,: University of Chicago Law Review, Winter 2005, v72n1pp. 27-48; Dialog file 15 #02875684, 32pgs.*
Stremersch; Stefan; "Strategic Bundling of Products and Prices: A New Synthesis for Marketing," Journal of Marketing, Jan. 2002, v66n1pp. 55-72; Dialog file 15 #02303240, 42pgs.*
Potter, Donald; "Discovering Hidden Pricing Power," Business Horizons, Nov. 2000, v43n6pp. 41; Dialog file 148 #13968409, 17pgs.*

*Primary Examiner*—Robert M. Pond
(74) *Attorney, Agent, or Firm*—Matthew W. Baca; Amy J. Pattillo

(57) ABSTRACT

The server system, communicatively connected to multiple client systems via a network, facilitates at least one web page for download to the client systems, where the web page offers multiple products for purchase. Responsive to the server system detecting a particular product selection from a particular client system, the server system downloads to the particular client system a first package offer of the client selected product and at least one second product from among at least one vendor selected product at a first price at a first discounted rate for purchase of both the client selected particular product and the at least one second product. In addition, the server system includes a selectable option for replacing the first package offer in the download of the first package offer. Responsive to detecting, at the server system a user selection of the selectable option from the particular client system, the server system creates at least one alternative product package offer for purchase of both the client selected product and at least one third product from among a different set of vendor selected products. The server system downloads the alternative product package offer to the client system for selection for purchase by the user, wherein the user is enabled to select a final product package including the client selected product and at least one third product form the different set of vendor selected products at a total price having a final discounted rate.

18 Claims, 5 Drawing Sheets

U.S. PATENT DOCUMENTS

| | | | |
|---|---|---|---|
| 6,693,651 B2 | 2/2004 | Biebesheimer et al. | 715/837 |
| 2003/0163392 A1 | 8/2003 | Banerjee et al. | 705/27 |
| 2004/0215524 A1* | 10/2004 | Parkyn | 705/26 |
| 2004/0267676 A1* | 12/2004 | Feng et al. | 705/400 |

* cited by examiner

PRESENTING AN ALTERNATIVE PRODUCT PACKAGE OFFER FROM A WEB VENDOR

BACKGROUND OF THE INVENTION

1. Technical Field

The present invention relates in general to improved electronic commerce and in particular to a web vendor offering alternative product package offers. Still more particularly, the present invention relates to enabling a user, responsive to initially offering the user a package with a user selected product and a vendor selected additional product at a price discounted by a rate for purchase via a web site, a selectable option to receive an alternative package offer with the user selected product and an alternative additional product at a price discounted also discounted by a rate for purchase.

2. Description of the Related Art

Network environments, such as the Internet, provide the infrastructure for vendors to connect with customers all over the world. In particular, electronic commerce continues to expand as more and more vendors provide product offerings on-line and more and more customers are able to access the Internet.

Web vendors may organize "web storefronts" in many different ways. Many web vendors will have a main web page that represents the entry point to the store and organizes the available products into a searchable directory. A main web page may include promotions for certain items or advertisements for a sale on a selection of items.

Many web vendors will organize multiple selectable products on a single page and responsive to a user selection of one of the products, will then open a product specific web page. A product specific web page may show a more detailed description of the product with specifications, photos, customer reviews, and other information. In addition, a selectable button to add the product to a "shopping cart" or to purchase the product immediately may be offered on the product specific page.

One of the disadvantages of a web based storefront is that because products are typically described on product specific web pages, it is more difficult for a web vendor to offer the same types of deals to entice customers to purchase multiple products or groups of products as are provided in a physical store-front. In an effort to persuade customers to purchase more products or groupings of products, some web vendors have pre-specified a single pairing of products to be offered to customers at a discounted price and only show the paired product offering to the user when the user selects to access the product specific web page of one of the products in the pair.

The disadvantage of pre-specified pairings is that the offering is static and only allows for the user to select or reject the offer, but not to access other special offers with the first selected product and the discount. A user may already have the other item in the pair, may not want the other item in the pair, or may not find the discount sufficient to want to purchase the other product.

In view of the foregoing, it would be advantageous to provide a method, system, and program for triggering alternative product pair offerings and in particular for placing a selectable option on a web page to enable a user to select to trigger an alternative product package offering with an alternative product but a similar discount when a pre-specified pairing or other deal is already made by a web vendor.

SUMMARY OF THE INVENTION

Therefore, the present invention provides for improved electronic commerce and in particular provides an improved method, system, and program for a web vendor offering alternative product package offers. Still more particularly, the present invention provides a method, system, and program for enabling a user, responsive to initially offering the user a package with a user selected product and a vendor selected additional product at a price discounted by a rate for purchase via a web site, a selectable option to receive an alternative package offer with the user selected product and an alternative additional product at a price also discounted by a rate for purchase.

In one embodiment, at least one server system is communicatively connected to multiple client systems via a network. The server system facilitates downloading at least one web page to the client systems, where the web page offers multiple products for purchase. Responsive to the server system receiving a particular product selection from a particular client system, the server system downloads a first package offer of the client selected product and at least one second product from among at least one vendor selected product at a first price at a first discounted rate for purchase of both the client selected particular product and the at least one second product. In addition, the server system includes a selectable option for replacing the first package offer in the download of the first package offer. Responsive to detecting, at the server system a user selection of the selectable option from the particular client system, the server system creates at least one alternative product package offer for purchase of both the client selected product and at least one third product from among a different set of vendor selected products. The server system downloads the alternative product package offer to the client system for selection for purchase by the user, wherein the user is enabled to select a final product package including the client selected product and at least one third product form the different set of vendor selected products at a total price having a final discounted rate.

The server system may detect user selection of the particular product from multiple user inputs including, but not limited to, the user selecting to view a description of the particular product, the user selecting to purchase the particular product, the user selecting the particular product from an on-line advertisement, and the user entering a search term for the particular product. Additionally, when a user returns to a web page specified for a particular product, the server system may detect user selection of the particular product.

A web page specification may specify the first package offer and the selectable option. In another embodiment, a web page specification may specify the first package offer and the server system, upon detecting a request for the web page, inserts the selectable option into the web page for download with the first package offer. Further, a server may detect a user selection of the particular product and create the first package offer and insert the first package offer with the selectable option into a web page accessed responsive to the user selection of the particular product.

In creating the alternative product package offer, the server system may first determine the different set of vendor selected products to offer to the user for selection as the third product. The server system downloads the different set of vendor selected products to the user and responsive to a user selection of at least one of the different set of vendor selected products, the server system creates the alternative product package offer with the client selected product and the user selection from among the different set of vendor selected products.

In addition, in creating the alternative product package offer, the server system may access offer rules that specify the price ranges, product categories, and other criteria for selecting the third product. Offer rules may include variables that are dependent upon current web site statistics, customer history, product history, and other accessible information.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
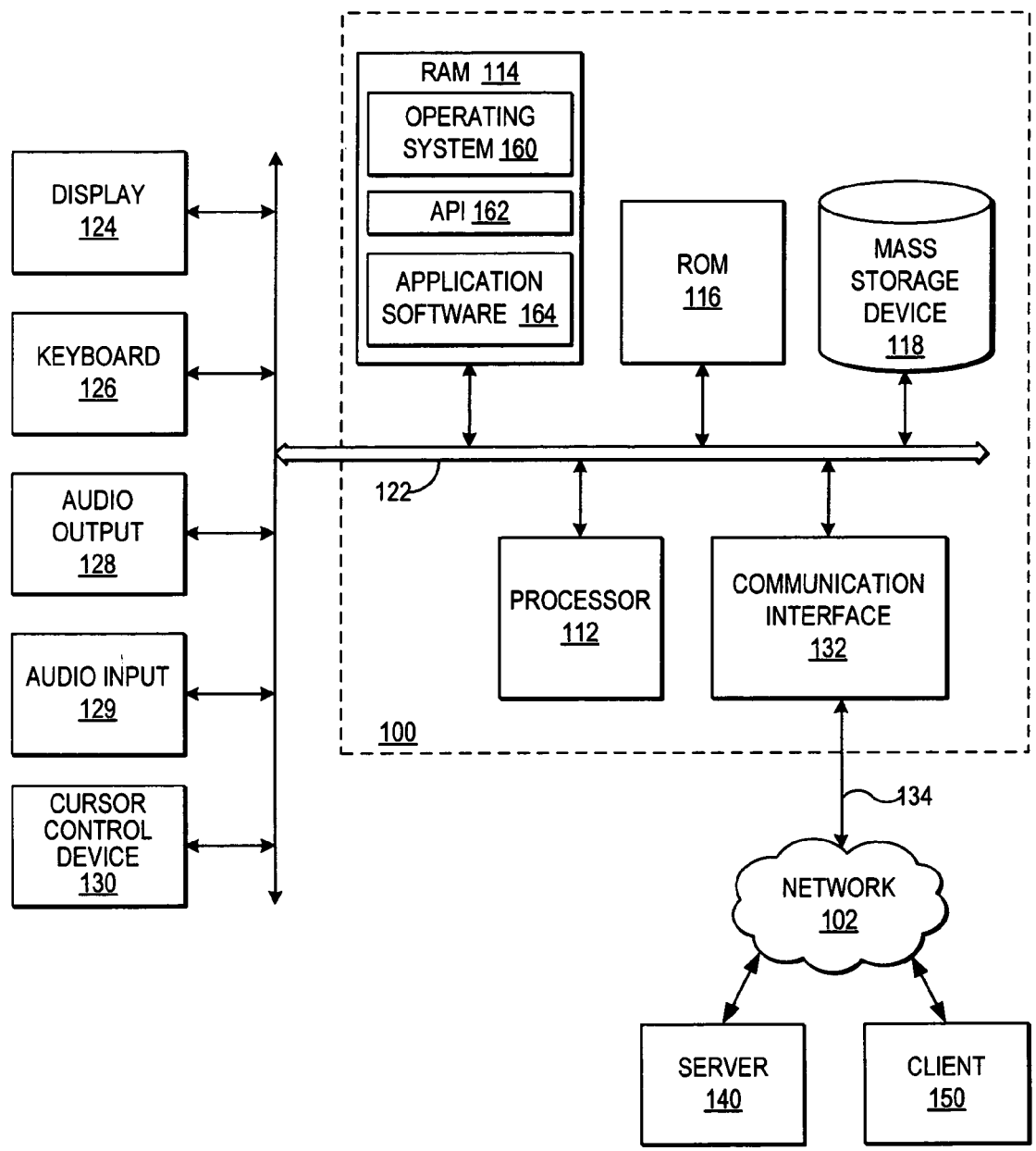
FIG. 1 is a block diagram depicting a computer system in which the present method, system, and program may be implemented.

Referring now to the drawings and in particular to FIG. 1, there is depicted one embodiment of a computing system through which the present method, system, and program may be implemented. The invention may be executed in a variety of systems, including a variety of computing systems and electronic devices.

Computer system 100 includes a bus 122 or other communication device for communicating information within computer system 100, and at least one processing device such as processor 112, coupled to bus 122 for processing program code and data. Bus 122 may include low-latency and higher latency paths that are connected by bridges and adapters and controlled within computer system 100 by multiple bus controllers. Processor 112 may be a general-purpose processor such as IBM's PowerPC (PowerPC is a registered trademark of International Business Machines Corporation) processor. When implemented as a server system, computer system 100 typically includes multiple processors designed to improve network servicing power.

Processor 112 is coupled, directly or indirectly, through bus 122 to memory elements. During normal operation, processor 112 processes data under the control of program code accessed from the memory elements. Memory elements can include local memory employed during actual execution of the program code, such as random access memory (RAM) 114, bulk storage, such as mass storage device 118, and cache memories (not depicted) which provide temporary storage of at least some program code to reduce the number of times code must be retrieved from bulk storage during execution. In one example, the program code accessible in RAM 114 is an operating system 160 and application software 164. Operating system 160 includes program code that facilitates, for example, a graphical user interface (GUI) via a display 124 and other output interfaces.

The invention can take the form of an entirely hardware embodiment, an entirely software embodiment, or an embodiment containing both hardware and software elements. In a preferred embodiment, the invention is implemented in software, which includes but is not limited to firmware, resident software, microcode, etc. For example, in one embodiment, operating system 160 and/or application software 164 contains program code that when executed on processor 112 carry out the operations depicted in the flow diagrams and flowcharts of FIGS. 8 and 9 and other operations described herein. Alternatively, the steps of the present invention might be performed by specific hardware components that contain hardwired logic for performing the steps, or by any combination of programmed computer components and custom hardware components. Additionally, RAM 114 may include an application programming interface (API) 162 or other interface that provides extensions to enable application developers to develop application software 164 that extend the functionality of operating system 160.

In addition, the invention can take the form of a computer program product accessible from a computer-usable or computer readable medium providing computer readable program code for use by or in connection with computer system 100 or any instruction execution system. For purposes of this description, a computer-usable or computer readable medium can be any apparatus that can contain, store, communicate, propagate, or transport the program for use by or in connection with the instruction execution system, apparatus, or device. In one example, a computer-usable or computer readable medium is any apparatus that participates in providing program code to processor 112 or other components of computer system 100 for execution.

Such a medium may take many forms including, but not limited to, electronic, magnetic, optical, electromagnetic, infrared, or semiconductor system (or apparatus or device) or a propagation medium. Examples of a computer readable medium include, but are not limited to, a semiconductor or solid state memory, magnetic tape, a flexible disk, a hard disk, a removable computer diskette, random access memory (RAM) 114, read-only memory (ROM) 116, punch cards or any other physical medium with patterns of holes, a rigid magnetic disk and an optical disk. Current examples of optical disks include a compact disc ROM (CD-ROM), a compact disc-read/write (CD-R/W) and a digital video disc (DVD). In another example, a computer readable medium may include mass storage device 118, which as depicted is an internal component of computer system 100, but may be provided as a device external to computer system 100.

A communication interface 132 including network adapters may also be coupled to the system to enable computer system 100 to become coupled to other computer systems, such as server 140 or client 150, remote printers, or storage devices through intervening private or public networks. Network adapters within communication interface 132 may include, but are not limited to, modems, cable modems, and Ethernet cards.

In particular, communication interface 132 enables coupling to other devices through a network link 134 to a network 102. For example, a local area network (LAN), wide area network (WAN), or an Internet Service Provider (ISP) may facilitate network link 134. Network link 134 may provide wired and/or wireless network communications to one or more networks, such as network 102. Network 102 may refer to the worldwide collection of networks and gateways that use a particular protocol, such as Transmission Control Protocol (TCP) and Internet Protocol (IP), to communicate with one another.

In general, network link 134 and network 102 both use electrical, electromagnetic, or optical signals that carry digital data streams. The signals through the various networks and the signals on network link 134 and through communication interface 132, which carry the digital data to and from computer system 100, are examples of forms of carrier waves transporting the information. In one example, a remote computer, such as server 140 transfers the program code for the invention to requesting computer system 100 by way of data signals embodied in a carrier wave or other propagation medium via a network link 134 to a communications interface 132 coupled to bus 122.

When implemented as a server system, computer system 100 typically includes multiple communication interfaces accessible via multiple peripheral component interconnect (PCI) bus bridges connected to an input/output controller. In this manner, computer system 100 allows connections to multiple network computers, such as client 150, via network 102.

In addition, computer system 100 typically includes multiple peripheral components (e.g. input/output devices) that facilitate communication. These peripheral components are coupled to computer system 100 either directly or indirectly through connections to multiple input/output (I/O) controllers, adapters, and expansion slots coupled to one of the multiple levels of bus 122. For example, an audio output device 128 and audio input device 129 are connectively enabled on bus 122 for controlling audio outputs and inputs. A display device 124 is also connectively enabled on bus 122 for providing visual, tactile or other graphical representation formats and a cursor control device 130 is connectively enabled on bus 122 for controlling the location of a pointer within display device 124. A keyboard 126 is connectively enabled on bus 122 as an interface for user inputs to computer system 100. In alternate embodiments of the present invention, additional input and output peripheral components may be added.

Those of ordinary skill in the art will appreciate that the hardware depicted in FIG. 1 may vary. Furthermore, those of ordinary skill in the art will appreciate that the depicted example is not meant to imply architectural limitations with respect to the present invention.

Figure 2:
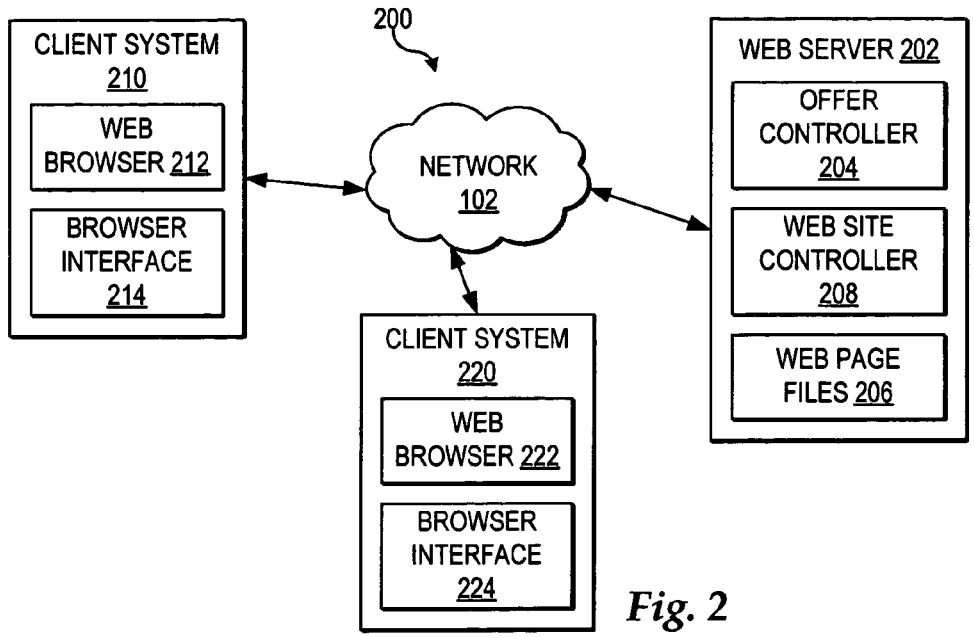
FIG. 2 is a block diagram depicting a network environment for supporting web communications.

With reference now to FIG. 2, a block diagram depicts a network environment for supporting electronic commerce in accordance with the method, system, and program of the present invention. As illustrated, a distributed network 200 is a network of multiple computer systems, such as computer system 100, through which web pages are accessed and downloaded. In alternate embodiments, distributed network 200 may include other embodiments of computing systems enabled to communicate with one another via a connection.

In the embodiment, distributed network 200 includes network 102, which is the medium used to provide communications links between various devices and computer connected together within distributed network 200. Network 102 may include permanent connections such as wire or fiber optics cables and temporary connections made through telephone connections and wireless transmission connections, for example.

In particular, in the embodiment, distributed network 200 includes at least one server, such as web server 202, and at least one client, such as client systems 210 and 220 communicatively connected via network 102. It will be understood that each of web server 202 and client systems 210 and 220 may be distributed in geographically disparate locations throughout heterogeneous types of computer systems operating within disparate local networks. In addition, it will be understood that web server 202 may represent a single server system, a cluster of server systems, a grid of server systems, or other combination of systems providing access to a particular web page or multiple web pages. In addition, it will be understood that distributed network 200 may include additional servers, clients, and other devices not shown.

Web server 202 and client systems 210 and 220 may communicate within distributed network 200 in conformance with different network environment architectures. In the embodiment depicted, distributed network 200 conforms to a client/server network architecture where web server 202 performs as a server for providing web services to client system 210 and client system 220 responsive to requests for web services from client system 210 and client system 220. In facilitating the client/server environment, in one example, network 102 represents the worldwide collection of networks and gateways that use the TCP/IP suite of protocols to communicate with one another. In another example, network 102 is implemented as an intranet, a local area network (LAN), or a wide area network (WAN). It will be understood that distributed network 200 may conform to other network environments or a combination of multiple types of network environments. Further, it will be understood that in the client/server environment, any of client systems 210 and 220 may perform as a "server" if providing web services to another computer system via network 102. Additionally, it will be understood that distributed network 200 may support peer-to-peer network communications between client system 210 and client system 220, where one client system distributes a web page to another client system.

Although not depicted in FIG. 2, following the description of computing system 100, in general, each of web server 202 and client systems 210 and 220 includes at least one processor and memory for supporting an operating system, APIs, and application programs. In addition, web server 202 may include middleware applications loaded into memory that support server functions, where the middleware applications may include, for example, IBM's Websphere or NetFinity (Websphere and NetFinity are registered trademarks of International Business Machines Corporation).

A web site controller 208 of web server 202 maintains separate communications with and downloads web pages and other data from web page files 206 to client systems 210 and 220 responsive to requests and communications received from client systems 210 and 220. In particular, web page files 206 include at least one web page stored in or across at least one data storage system or memory accessible to web server 202. In particular, a web page is a document consisting of a particular web protocol based file, with associated files for graphics, embedded audio and video players, and scripts, in a particular directory, such as web page files 204, on a particular server system, such as web server 202. A web page may be identified and requested by a uniform resource locator (URL), where the URL specifies the protocol to be used in accessing the web page and the name of the web server on which the web page resides (e.g. web server 202 is registered with network 102 through a particular URL in the example). In addition, a web page may include selectable links to other web pages located on the same web server or another web server.

In one embodiment, web site controller 208 downloads web pages that include selectable purchasable products from one or more electronic web vendors. In particular, selectable purchasable products may be represented in multiple forms including, but not limited to, an electronic advertisement, a search result listing, an auction result listing, a product directory listing, a product description listing, and other selectable output forms. Web site controller 208 may control both the creation of dynamic web pages with purchasable product offerings for download to client systems 210 and 220 and the management of purchase requests for purchasable products as received from client systems 210 and 220. Further, web site controller 208 may be controlled by the actual product vendor or an entity acting on behalf of the actual product vendor.

According to an advantage, web server 202 also includes an offer controller 204. Offer controller 204 controls the creation and management of package offers to users at client systems 210 and 220. In particular, package offers may include a general package offer of a user selected product and a vendor selected additional product at a price discounted by a particular discount rate and an alternative product package offer of the user selected product and an alternative additional product at a total price discounted by a final discount rate.

In one embodiment, the coding for a web page that includes a selectable representation of a purchasable product includes a pre-specified general package offer for the purchase of the purchasable product and an additional product at a price discounted by a particular discount rate. Offer controller 204 detects the pre-specified general package offer and creates a selectable option button that is dynamically added to the web page. If a user selects the selectable option button, then offer controller 204 controls the creation and presentation of an alternative product package offer with the user selected purchasable product and at least one alternative product at a price discounted by the discount rate.

In another embodiment, the coding for a web page may trigger offer controller 304 to access a pre-specified general package offer for the purchasable product or to create a general package offer with the selectable option of an alternative product package offer. Responsive to a user access to the web page, offer controller 204 controls presentation of the general package offer with the selectable option of an alternative product package offer within the web page downloaded by web site controller 208.

In yet another embodiment, offer controller 204 monitors user inputs communicated from client systems 210 and 220 to web server 202 for the indication of a "selection" of a purchasable product by the user. In particular, a selection may include the user selecting an electronic advertisement for the purchasable product, a user entering a search term for the purchasable product, a user selecting to view a description of a purchasable product and other selections that indicate user interest in a particular purchasable product. Upon detection of a selection of a purchasable product by the user, offer controller 204 controls the creation and presentation of a general package offer with a selectable option for an alternative product package offer. In particular, it is important to note that while web site controller 208 and offer controller 204 are depicted as located within a single web server 202, web site controller 208 and offer controller 204 may be located in physically disparate web servers and may be operated by disparate web vendors. Further, it is important to note that offer controller 204 may create and present general package offers and alternative product purchase offers that include products from a single or multiple vendors, controlled by a single or different web site controllers, and are displayed within a web page window independent of the vendor or vendors actually selling the products. Thus, offer controller 204 may act as a broker or distributor for other web vendors in the creation and presentation of general package offers and alternative product package offers.

Client systems 210 and 220 include software that facilitates communication with web server 202. In particular, in the example, client systems 210 and 220 include web browsers 212 and 222, respectively, where a web browser is application software that facilitates web page access requests and the display of accessed web pages through a browser interface 214 or 224, for example. In one example, browser interface 214 or 224 includes a browser window displayed within a GUI. In another example, browser interface 214 or 224 may include an audio interface where the contents of a web page are output in an audible format. A browser interface, such as browser interface 214 or 224, may be supported by an operating system (not depicted) and controlled by web browser 212 or 222, for example. It will be understood that web browsers 212 and 222 may be integrated within an operating system, such as operating system 160, or other application software or may function as stand-alone application software. In addition, it will be understood that browser interfaces 214 and 224 may be incorporated within a user interface consisting of the peripherals accessible to each client system.

In general, web browsers 212 and 222 receive web page downloads from web server 202 and facilitate the display of the web pages as downloaded through browser interfaces 214 and 224. Web pages may include representations of purchasable products, that when selected by a user via browser interface 214 or 224 trigger web browsers 212 and 222, respectively, to communicate selections of purchasable products to web server 202. In addition, web pages may include offers to purchase products, general package offers to purchase a user selected purchasable product and a vendor selected additional product, selectable options to receive an alternative product package offer, and alternative product package offers.

In another embodiment, a web browser, such as web browser 212 may detect the presentation of a general package offer of a user selected purchasable product and an additional vendor selected product at a discounted price in a web page download. Responsive to detecting the presentation of the general package offer, web browser 212 may add a selectable button or trigger a selectable menu option for a user to select to request an alternative product package offer from the web vendor. Then, responsive to a user selection of the option or a browser setting to automatically select the option, web browser 212 communicates a request to web server 202 to trigger offer controller 204 to return an alternative product package offer if available.

Figure 3:
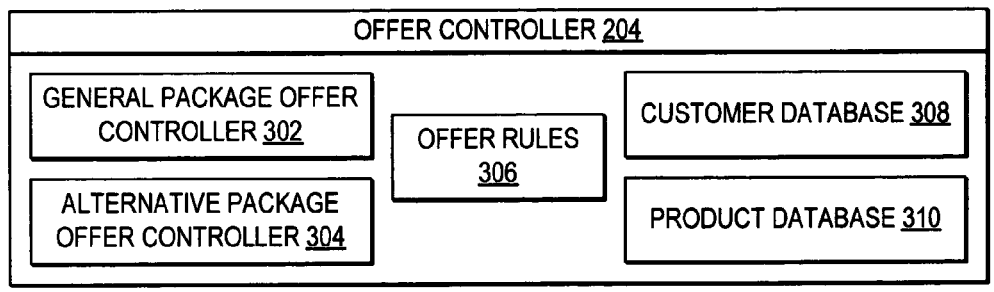
FIG. 3 is a block diagram depicting examples of components of an offer controller.

With reference now to FIG. 3, a block diagram depicts components of an offer controller in accordance with the method, system, and program of the present invention. As illustrated, offer controller 204 includes a general package offer controller 302 and an alternative package offer controller 304.

General package offer controller 302 controls the creation and presentation of general package offers made to a user of products included in product products database 310, based on rules, such as offer rules 306. In one embodiment, general package offer controller 302 is triggered to create a general package offer when a user selects a product. A user selection of a product may include, but is not limited to, a user selection to purchase a product, a user selection to view a description of a product, a user selection of an electronic ad featuring a product, and a user entry of a search term for a product or range of products. General package offer controller 302 creates a general package offer that includes the user selected product and at least one additional vendor selected product at a discounted price. Offer rules 306 may designate the type of discounting and the type of additional product to be included in the general package offer. For example, if a user selects to view a description of a book by a particular author, then offer rules 306 may specify that a package offer with the selected book and another book by that author can be offered for a price discounted by 10%. Alternatively, offer rules 306 may designate the specific product and the specific discount to be included in the general package offer. Further, general package offer controller 302 need not create a general package offer for one to be made through a web page; a web page may include a general package offer of the user selected product and an additional product at a discounted price within the web page file.

According to an advantage, a web page for a user selected product may include a selectable option, with a general package offer, for the user to select an alternative product for the offer. Alternatively, according to an advantage, alternative package offer controller 304 controls the creation and the presentation of a selectable option for a user to select to trigger the creation and presentation of an alternative product package offer by alternative package offer controller 304. The selectable option for an alternative product package offer may be included within an existing web page as a selectable button or within a new web page window, for example.

Once a user selects to receive an alternative product package offer, alternative package offer controller 304 controls the creation and presentation of alternative product package offers made to a user. It will be understood that an existing vendor web page may be adapted to include the alternative product package offers or that additional windows may be opened in a user interface to display the alternative product package offers.

In one embodiment, alternative package offer controller 302 creates a single alternative product package offer that includes the user selected product and a vendor selected alternative additional product selected according to offer rules 306. For example, where a general package offer includes a compact disc for a particular artist as selected by the user and another compact disc by the same artist, the alternative product package offer may include an alternative product of another alternate compact disc by the same artist.

In another embodiment, alternative package offer controller 302 creates multiple alternative product package offers according to offer rules 306. For example, where the general package offer includes the compact disc for a particular artist as selected by the user, multiple alternative product package offers may be created where alternative additional products include additional compact discs by the same artist, compact discs by artists in the same genre, compact discs by artists in the same genre that are from the overstock inventory, and a DVD video from the same artist.

Further, alternative package offer controller 302 may create an alternative product package offer where the user first selects the alternative additional product from among a constrained selection of available alternative products according to offer rules 306 and then alternative package offer controller 302 creates and presents the alternative product package offering with the initial user selected product and the alternative user selected product at a price discounted by the discount rate. For example, the alternative additional product may be constrained to any product offered by the web vendor with a price that is between $10 and $15, wherein alternative package offer controller 302 first performs a search for all products that meet the price range requirement and presents the search products to the user for selection of an alternative additional product for the alternative product package offer.

Figure 4:
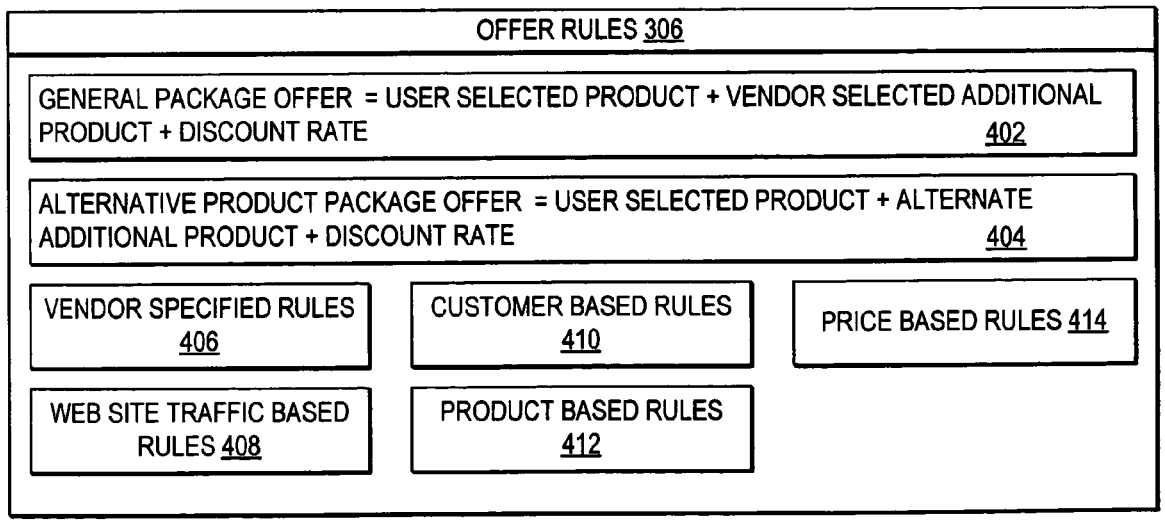
FIG. 4 is a block diagram depicting examples of types of offer rules.

With reference now to FIG. 4, a block diagram illustrates examples of types of offer rules in accordance with the method, system, and program of the present invention. It will be understood that offer rules 306 may include multiple types of rules grouped according to multiple categories in addition to those groupings depicted in the example.

Offer rules 306 may include rules for defining package offers generally. For example, FIG. 4 depicts examples of the basic types of offer rules 306. First, as depicted at reference numeral 402, the rule when general package offer controller 302 creates a general package offer requires the offer to include a user selected product and a vendor selected additional product with a price discounted by a particular discount rate. It is important to note that general package offer controller 302 may create a general package offer that includes a pre-specified pairing or that the coding for a web page may include a pre-specified offering that is detected by alternative package offer controller 304 as a general package offer according to the offer rules.

The rule when alternative package offer controller 304 creates an alternative product package offer, as illustrated at reference numeral 404 requires the offer to include the user selected product from the general product offer package with an alternative additional product at a price discounted by the discount rate from the general product package offer. Other rules may specify the discount rate and which products may be selected as an alternative additional product for the alternative product package offer. In addition, it is important to note that the alternative additional product may include a grouping of alternative products from a single or multiple vendors and that the discount rate may be normalized or adjusted to reflect variations between the vendor selected additional product and the alternative additional product. Further, it is important to note that other basic structures may be implemented for the general package offer and the alternative product package offer. Additionally, it is important to note that the product or set of products available for selection as the alternative additional product may be the same set of products or a different set of products from the product or set of products specified for the general package offer.

In addition, as illustrated in FIG. 4, offer rules 306 may include vendor specific rules, as illustrated at reference numeral 406. For example, one web vendor may specify a discount rate of 5% while a second web vendor specifies a discount rate of 4.5%. In particular, offer controller 204 may control general and alternative package offers for a single or multiple web vendors at a single web site or across multiple web sites. For example, a search engine web site may enable offer controller 204 to detect product search terms, create a general package offer from a single or multiple web vendors with the user selected search term product and an additional product, and add the general package offers and a selectable option for an alternative product package offer to the search results display. In another example, an electronic auction web site may enable offer controller 204 to detect product search terms, detect vendors with the user selected product who also offer other products, create a general package offer for single or multiple web vendors auctioning the user selected product, and offer a selectable option for an alternative product package offer to the auction products results display.

Further, as illustrated in FIG. 4, offer rules 306 may include web site traffic based rules, as illustrated at reference numeral 408. For example, a discount rate used in creating a general package offer or alternative product package offer may vary based on web site traffic based rules that set the current discount rates. In another example, the vendor selected additional product or alternative additional products available for package offers may vary based on web site traffic based rules. Web site traffic based rules may include factors such as number of visits per hour, actual purchases per hour, number of searches per hour, and other current web site statistics.

Offer rules 306 may also include customer based rules, as illustrated at reference numeral 410. In one example, customer based rules may specify that a customer with a particular threshold of previous purchases receives a first discount rate and a customer with a second threshold of previous purchases receives a second discount rate. Offer controller 204 may access customer information from customer database 308, that includes customer identifiers, billing and sales profiles, previous purchase history, and other information gathered information about a customer. Additionally, offer controller 204 may access customer information from cookies located locally at a customer computer or from customer data gathering service providers.

In addition, offer rules 306 may include product based rules, as illustrated at reference numeral 412. In one example, product based rules specify which product or products listed in product database 310 can be selected as an alternative additional product for a particular user selected product. In particular, a product based rule may specify a category of products or a grouping of products available as an alternative product. Product database 310 includes product identifiers, categories, groupings, descriptions, prices, vendors, shipping specifications, and other product related information. In one example, a product based rule may specify that if the user selected product is a compact disk, then the alternative additional product must be a book or a compact disk. In another example, a product based rule may specify that if a user selects an alternative product package offer, then a product that is considered "overstock" is to be offered.

Further, offer rules may include price based rules, as illustrated at reference numeral 414. Price based rules may specify the pricing constraints for the selection of an alternative additional product. For example, a price based rule may allow selection of any product in inventory as the alternative additional product, as long as the price of the product is within 5% of the price of the vendor selected additional product. In another example, a price based rule may specify that a user may select any other product, but that the discount rate will be adjusted by some factor of the difference between the price of the vendor selected additional product and the alternative additional product. For example, if the vendor selected additional product costs $5 and the user selects an alternative additional product that costs $1000, then the original discount rate of 10% may be adjusted to compensate for the difference is cost.

Figure 5:
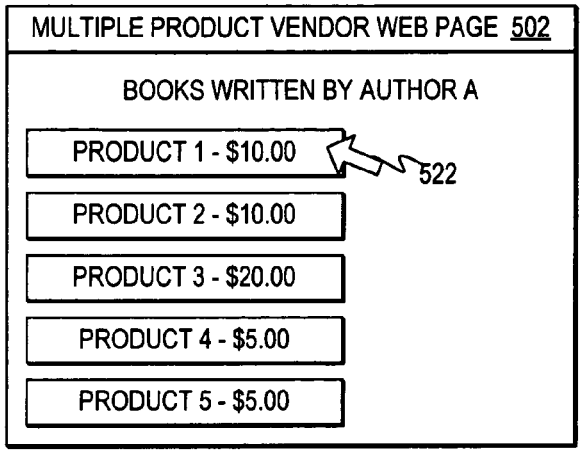
FIG. 5 is an illustrative diagram depicting a product selection page for a particular web vendor.

Referring now to FIG. 5, an illustrative diagram depicts a product selection page for a particular web vendor. As illustrated, a window 502 illustrates a web page for a web vendor with multiple products. The web page illustrated in window 502 includes multiple selectable product buttons labeled "product 1", "product 2", "product 3", "product 4", and "product 5" under the category of "Books written by Author A". For purposes of description, the web vendor specifies the display of available products and the selection process for viewing product descriptions or selecting to purchase products. Therefore, it will be understood that the web page illustrated in window 502 merely shows one example of a web vendor displaying selectable products, but that other methods for displaying selectable products may be implemented. Further, it will be understood that selectable products from multiple web vendors may be displayed in a single web page window.

As illustrated, a user indicates a selection from among the selectable product buttons by positioning cursor 522 over the product button labeled "product 1" and entering an additional input. Responsive to a user selection of a particular product, general package offer controller 302 creates a general package offer with "product 1" and a vendor selected product with a selectable option for an alternative product package offer.

Figure 6:
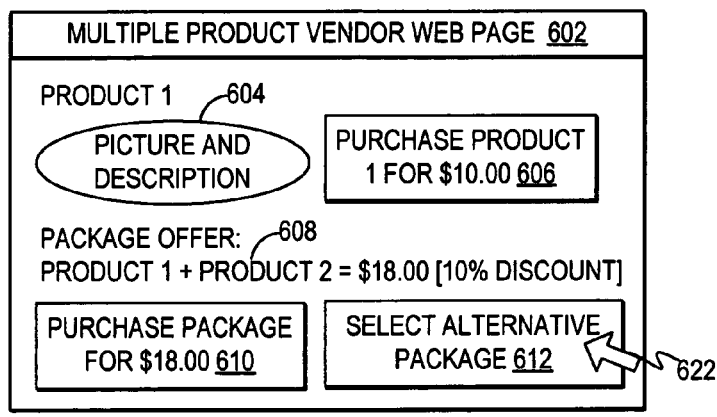
FIG. 6 is an illustrative diagram depicting a general package offer with a selectable option for an alternative product package offer.

With reference now to FIG. 6, an illustrative diagram depicts a general package offer with a selectable option for an alternative product package offer. As depicted, responsive to the user selection of "product 1" in window 502, the web page illustrated in window 602 is downloaded with a picture and description of "product 1" as illustrated at reference numeral 604 and a selectable button for purchase of "product 1" for $10.00 as illustrated at reference numeral 606.

In addition, the web page illustrated in window 602 displays a general package offer, as illustrated at reference numeral 608. The general package offer illustrated at reference numeral 608 includes "product 1" and "product 2" at a price discounted by a discount rate of 10%. Additionally, the web page illustrated in window 602 displays a selectable package offer button 610, the selection of which triggers a purchase of the general package offer. Further, the web page illustrated in window 602 displays a selectable option button 612, the selection of which triggers the creation of an alternative product package offer. In the example, the user indicates a selection of selectable option button 612 through the positioning of cursor 622 and entry of an additional input, such as depressing a button on a mouse.

Figure 7:
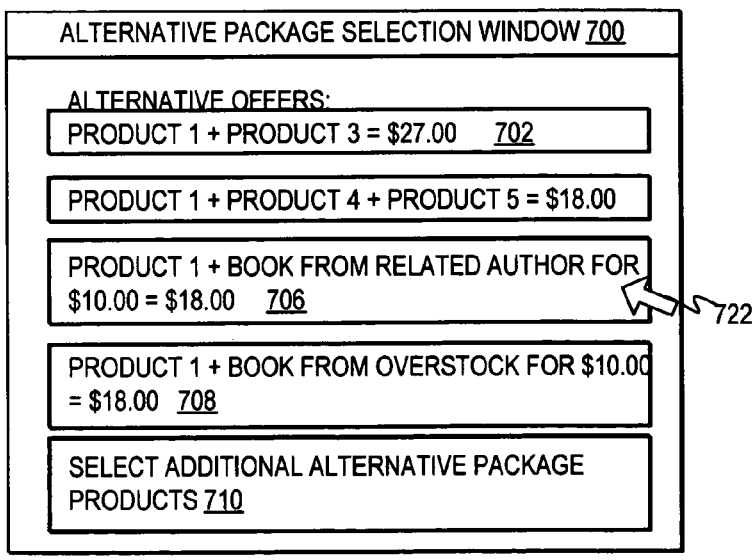
FIG. 7 is an illustrative diagram depicting an alternative package selection window with multiple alternative product package offers

Referring now to FIG. 7, an illustrative diagram depicts an alternative package selection window with multiple alternative product package offers. In the example, responsive to a user selection of selectable option button 612 in the web page illustrated in window 602, alternative package offer controller 304 creates multiple alternative product package offers and triggers an additional window 700 for display of the alternative product package offers. In an alternate embodiment, the multiple alternative product package offers may be displayed within an existing web page window, such as window 602 or other browser output interfaces. In addition, in an alternate embodiment, only one of the multiple available alternative product package offers may be offered at a time or a user may be provided the option to first select from among multiple products available as alternative products and then offer a package with the selected alternative product.

In the example, alternative package selection window 700 includes a first alternative offer illustrated at reference numeral 702 of "product 1" and "product 3" at a price discounted by the discount rate of 10%. A second alternative offer depicted at reference numeral 704 includes "product 1", "product 4", and "product 5" at a price discounted by the discount rate of 10%. A third alternative offer illustrated at reference numeral 706 includes "product 1" and a book by a related author that costs $10.00 for a price discounted by the discount rate of 10%. In one example, an additional offer may be made to the user to select the exact book by the related offer to include in the alternative offer, responsive to a user selection of the offer as illustrated by the positioning of cursor 722. A fourth alternative offer depicted at reference numeral 708 includes "product 1" and a book from overstock priced at $10.00 for a price discounted by the discount rate of 10%. In one example, a specific book from the "overstock" category of books may be specified in the offer or a user may be provided the option to select from books listed in the "overstock" category of books within the particular price range. A fifth alternative offer illustrated at reference numeral 710 includes an option to selection additional package products. Responsive to a user selection of the fifth alternative offer, alternative package offer controller 304 may select a list of other alternative products to offer for the user selection as part of an alternative package offer.

Figure 8:
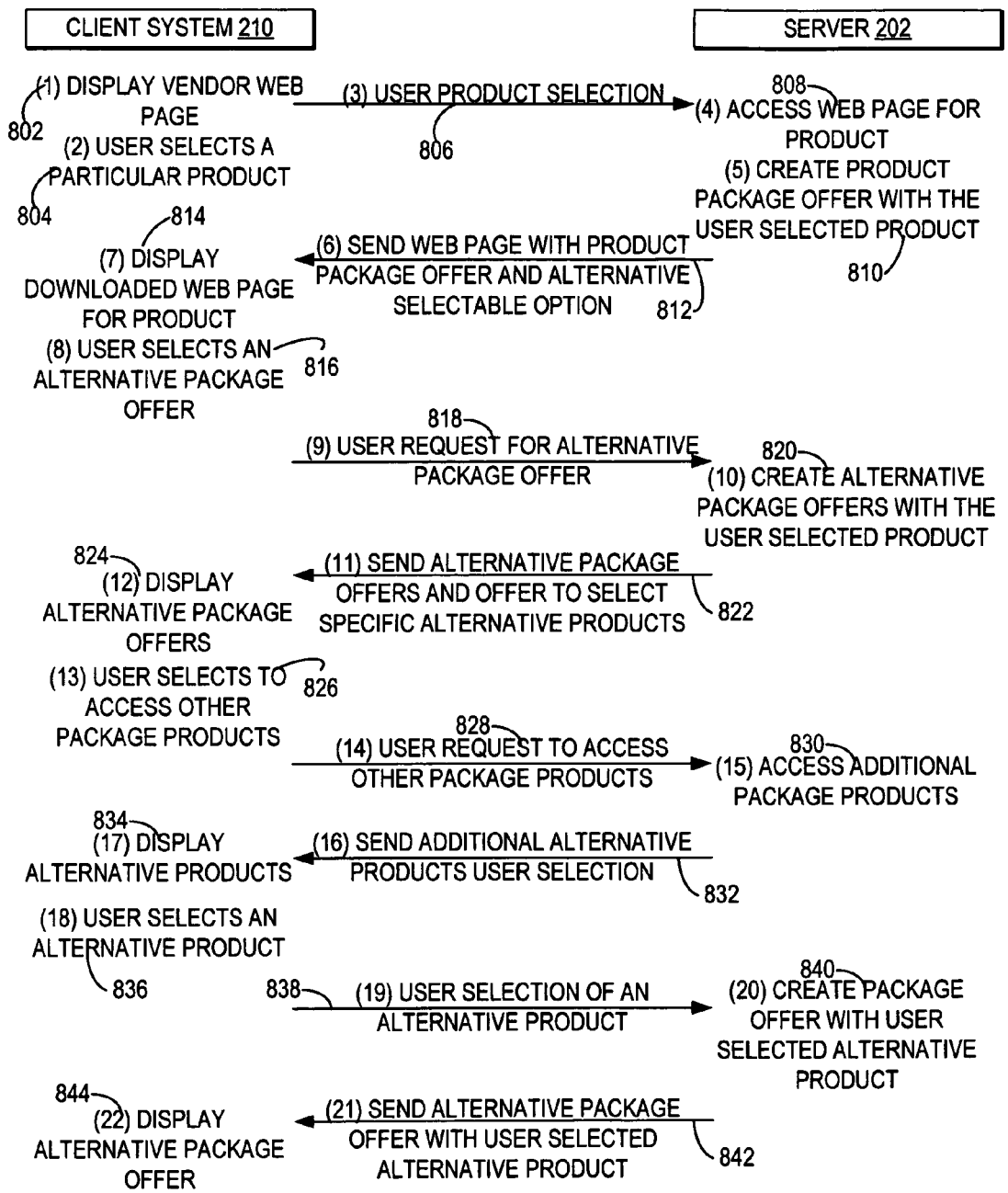
FIG. 8 is a flow diagram depicting the communication between a client system accessing a server system that controls product package offers made to the user at the client system.

With reference now to FIG. 8, a flow diagram depicts the communication between a client system accessing a server system that controls product package offers made to the user at the client system. As illustrated at reference numeral 802, at client system 210, web browser 212 facilitates the display of a particular web vendor's product web page. A user at client system 210 selects a particular product from the vendor's web page, as illustrated at reference numeral 804. Client system 210 communicates the user selection of the particular product to server 202, as illustrated at reference numeral 806. Server 202 detects the selection of the particular product and web site controller 208 accesses a web page for the particular product, as illustrated at reference numeral 808, and offer controller 204 creates a first, general product package offer with the user selected product and a second product at a price discounted by a particular rate, as depicted at reference numeral 810. Offer controller 204 may select the second product and the particular rate for discounting the price according to offer rules.

Server 202 downloads the web site with the first product package offer to client system 210, as illustrated at reference numeral 812. Web browser 212 at client system 210 displays the downloaded web page with selectable option, as illustrated at reference numeral 814. A user at client system 210 selects the selectable option for an alternative product package offer, as depicted at reference numeral 816, and client system 210 communicates the user selection to server 202, as illustrated at reference numeral 818.

Server 202, responsive to receiving the communication of the user request for an alternative package offer, triggers offer controller 204 to create alternative package offers with the user selected product, as illustrated at reference numeral 820. Server 202 downloads the alternative package offers to client system 210, as illustrated at reference numeral 822. In addition to downloading alternative package offers, server 202 may download an offer for the user to select specific alternative package products. Web browser 212 controls the display of the alternative package offers and the offer to select specific products, either in the same web page as the previous offers, or within a separate window. In the example, the user at client system 210 selects the offer to select other package products, rather than selecting from one of the alternative package offers, as illustrated at reference numeral 826 and client system 210 communicates the selection of the offer to server 202, as illustrated at reference numeral 828. Alternatively, the user at client system 210 may select to purchase one of the alternative package offers, triggering server 210 to initiate a purchase process.

Server 202, responsive to receiving the communication of the user request to select from specific alternative products, triggers offer controller 204 to access additional specific package products, as illustrated at reference numeral 830, and downloads the additional alternative products for user selection, as illustrated at reference numeral 832. Web browser 212, responsive to receiving the download of alternative products for user selection, displays the alternative products, as illustrated at reference numeral 834. In one example, a separate window is opened to display the selectable alternative products. The user at client system 210 selects one of the alternative products, as illustrated at reference numeral 836 and client system 210 communicates the user selection to server 202, as illustrated at reference numeral 838. Server 202, upon receipt of the alternative product selection, triggers offer controller 204 to create an alternative product package offer with the user selected alternative product, as illustrated at reference numeral 840 and downloads the offers to client system 210, as illustrated at reference numeral 842. Web browser 212 displays the alternative package offer, as illustrated at reference numeral 844.

It is important to note that throughout the illustrated flow diagram, a user may select to purchase the current offer, rather than selecting a next option to continue defining the alternative offer. Further, it is important to note that each offer presented to a user may include additional restrictions. For example, a user may be given the option to save an offer for later purchase or an offer may include an expiration time.

Figure 9:
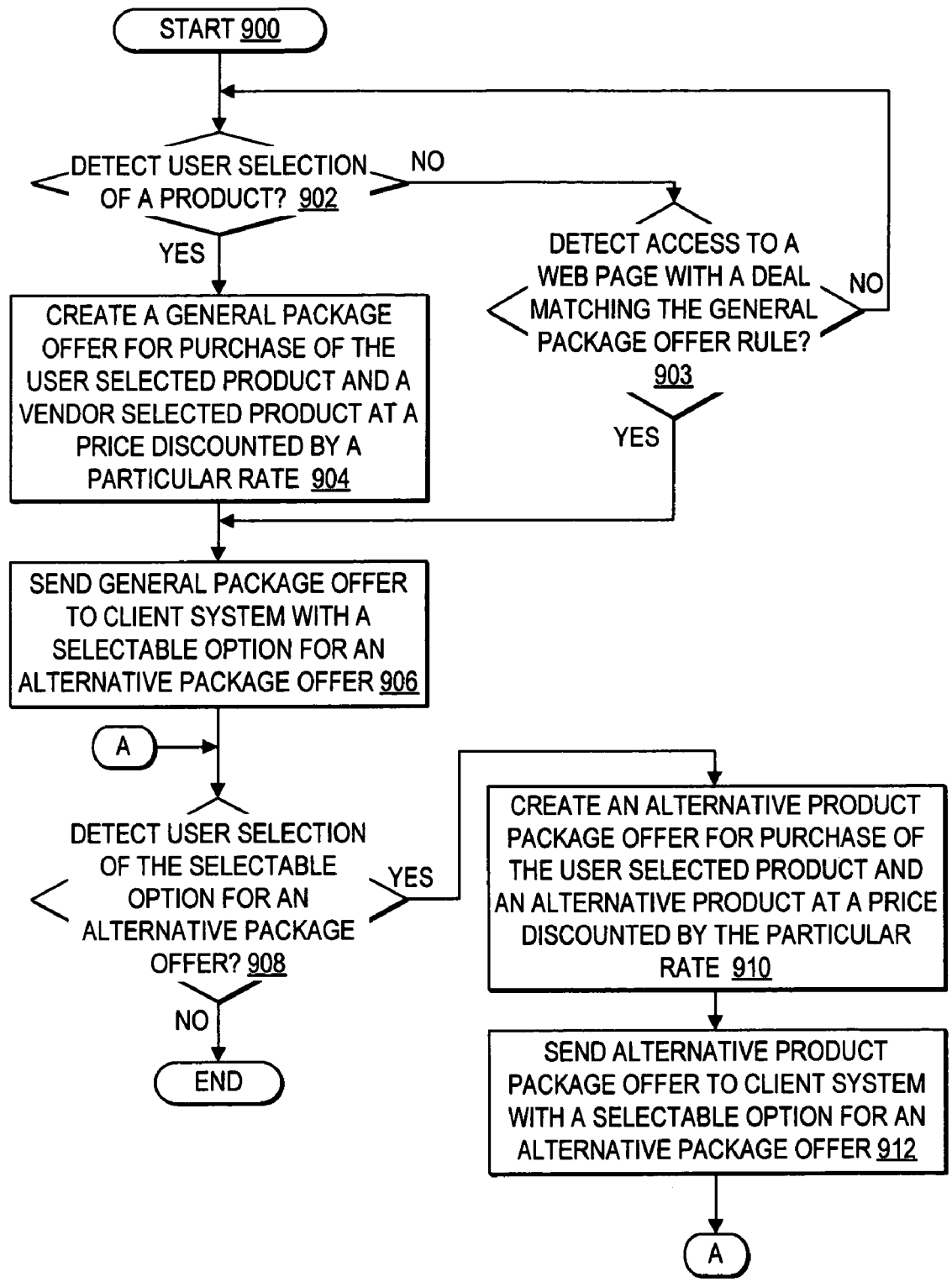
FIG. 9 is a high level logic flowchart depicting a process and program for a server controlling package offers made to a user at a client system communicatively connected to the server.

With reference now to FIG. 9, there is depicted a high level logic flowchart of a process and program for a server controlling package offers made to a user at a client system communicatively connected to the server in accordance with the method, system, and program of the present invention.

As illustrated, the process starts at block 900 and thereafter proceeds to block 902. Block 902 depicts a determination whether the server system detects a user selection of a particular product. The server system may detect a user selection of a particular product from multiple types of communications from a client system including, but not limited to, a user selection to view a description of the particular product, a user selection to purchase the particular product, a user selection of an advertisement for the particular product, or a user entry of a search term for a particular product. A user selection of a particular product may be inferred, where a user indicated interest in a particular product during a previous visit to the web site, and the user has returned again to the web site. It will be understood that additional inputs by a user may indicate user interest, and thus user selection, of the particular product.

At block 902, if the server system does not detect a user selection of a particular product, then the process passes to block 903. Block 903 depicts a determination whether the server system detects access to a web page with a deal or offer that matches the general package offer rule. In particular, the offer rules may specify a general package offer rule, such as the general rule illustrated at reference numeral 402 in FIG. 4, for a general package offer. If the server system does not detect access to a web page with an offer that matches the general package offer rule, then the process returns to block 902. Otherwise, if the server system detects access to a web page with an offer that matches the general package offer rule, then the process passes to block 906.

Otherwise, returning to block 902, if the server system detects a user selection of a particular product, then the process passes to block 904. Block 904 illustrates the server system creating a general package offer of the user selected product and a vendor selected additional product with a price discounted at a particular rate, and the process passes to block 906. Alternatively, a web page may specify the vendor selected additional product and rate for discounting the price.

Block 906 depicts the server system sending the general package offer to the client system with a selectable option for an alternative product package offer, and the process passes to block 908. In particular, the selectable option for an alternative product package offer may include an offering to view multiple variations of alternative product package offerings including, but not limited to, a single alternative product package offer, multiple alternative product package offers, or a selection of alternative products that may be combined with the user selected product into an alternative product package offer.

Block 908 illustrates a determination whether the server system detects a user selection of the selectable option for an alternative package product offer. The server system may detect a user selection of the selectable option from a communication from the client system. At block 908, if the server system does not detect a user selection of the selectable option, then the process ends. In particular, if the server system detects a user selection to purchase the product alone or one of the product package offers presented to the user, then the server system may infer that it does not detect a user selection of the selectable option and the process ends. Otherwise, at block 908, if the server system detects a user selection of the selectable option, then the process passes to block 910. Block 910 depicts the server system creating at least one alternative product package offer for purchase by the user, where the alternative product package offer includes the user selected product and an alternative product at a price discounted by the particular rate. Additionally, creating at least one alternative product package offer may include sending the user a selection of available products for combination with the user selected product in an alternative product offer, detecting the user selection of a particular alternative product, and creating the alternative product package offer with the original user selected product and the user selected alternative product. Next, block 912 illustrates the server system sending the alternative product package offer to the client system with a selectable option for an alternative package offer, and the process passes to block 908.

While the invention has been particularly shown and described with reference to a preferred embodiment, it will be understood by those skilled in the art that various changes in form and detail may be made therein without departing from the spirit and scope of the invention.

What is claimed is:

1. A method, in at least one server system communicatively connected to a plurality of client systems via a network, wherein said server system facilitates at least one web page for download to said plurality of client systems for offering a plurality of products for purchase from a vendor, comprising:

displaying within a user interface of a particular client system, a first vendor web page within a first browser window of a browser comprising a plurality of selectable buttons, wherein selection of each of said selectable buttons triggers a product selection of a separate product from among a plurality of products;

in response to said at least one server system receiving a particular product selection from among said plurality of products by a user selection of one of said plurality of selectable buttons from said particular client system:

downloading, to said particular client system, a first package offer with a selectable option for replacing said first package offer specified for output within a second browser window of said browser, wherein said first package offer comprises the client selected particular product and at least one second product from among at least one vendor selected product at a first price at a first discounted rate for purchase of both the client selected particular product and said at least one second product;

responsive to detecting, at said server system, a selection of said selectable option by said user from said particular client system, creating at least one alternative product package offer for purchase of both said client selected particular product and at least one third product from among a different set of vendor selected products; and downloading, to said particular client system, said alternative product package offer to said particular client system for selection for purchase by said user specified for output in an additional browser window of said browser separate from said first browser window and said second browser window, such that said user is enabled to select a final product package comprising the client selected particular product and said at least one third product from said different set of vendor selected products at a total price having a final discounted rate.

2. The method according to claim 1 for offering an alternative product package offer, further comprising:

detecting said selection by said user of said particular product from at least one of said particular client system communicating said user selecting to view a description of said particular product, said user selecting to purchase said particular product, said user selecting said particular product from an on-line advertisement, and said user entering a search term for said particular product.

3. The method according to claim 1 for offering an alternative product package offer, wherein downloading a first package offer to a particular client system from among said plurality of client systems with a selectable option for replacing said first package offer, further comprises:

detecting, at said server system, a request from said particular client system to access said web page, wherein a coding for said web page specifies said first package offer; and responsive to detecting said request to access said web page with said coding specifying said first package offer, automatically creating a selectable option button for said selectable option and dynamically inserting said selectable option button for replacing said first package offer in said coding for said download for said web page with said first package offer to said particular client system.

4. The method according to claim 1 for offering an alternative product package offer, wherein downloading a first package offer to a particular client system from among said plurality of client systems with a selectable option for replacing said first package offer, further comprises:

responsive to detecting said particular product selected by said user, creating said first package offer according to at least one offer rule specifying a selection of products available as said at least one vendor selected product.

5. The method according to claim 1 for offering an alternative product package offer, wherein creating at least one alternative product package offer for purchase of both said client selected particular product and at least one third product from among a different set of vendor selected products, further comprises:

responsive to detecting, at said server system, said selection of said selectable option by said user from said particular client system, determining said different set of vendor products to offer to said user for selection as said at least one third product;

downloading said different set of vendor products to said particular client system, wherein said user is enabled to select at least one from among said different set of vendor products; and responsive to detecting, at said server system, at least one alternate product selected by said user from among said different set of vendor products, creating said alternative product package offer with said alternate product as said third product in said alternative product package offer.

6. The method according to claim 1 for offering an alternative product package offer, wherein creating at least one alternative product package offer for purchase of both said client selected particular product and at least one third product from among a different set of vendor selected products, further comprises:

selecting said third product from among said different set of vendor selected products according to at least one offer rule specifying at least one of a requirement for a price range for said third product and a requirement for a product category for said third product.

7. The method according to claim 1 for offering an alternative product package offer, wherein creating at least one alternative product package offer for purchase of both said client selected particular product and at least one third product from among a different set of vendor selected products, further comprises:

creating said alternative product package offer for purchase of both said particular product and said third product, wherein said particular product is offered by a first web vendor and said third product is offered by a second web vendor and a third web vendor facilitates said alternative product package offer.

8. The method according to claim 1 for offering an alternative product package offer, further comprising:

monitoring, by said at least one server system, current monitored web traffic comprising a number of visits per hour, a number of actual purchases per hour, and a number of searches per hour; and adjusting said first discounted rate and said final discounted rate according to a web site traffic based rule that adjusts a discount rate applied to said first discounted rate and said final discounted rate based on said current monitored web traffic.

9. The method according to claim 1 for offering an alternative product package offer, further comprising:

in response to not receiving said particular product selection from said client system, detecting whether said at least one server system accesses said web page with an offer that matches a general package offer rule for offering said client selected particular product with at least one vendor selected product at said first discounted rate;

in response detecting said at least one server system accesses said web page with said offer that matches said general package offer rule, downloading, to said particular client system, said offer with said selectable option for replacing said first package offer.

10. A system for offering an alternative product package offer, comprising:

at least one server system communicatively connected to a plurality of client systems via a network, wherein said server system facilitates at least one web page for download to said plurality of client systems for offering a plurality of products for purchase from a vendor;

a particular client system from among said plurality of client system for displaying within a user interface of said particular client system, a first vendor web page within a first browser window of a browser comprising a plurality of selectable buttons, wherein selection of each of said selectable buttons triggers a product selection of a separate product from among a plurality of products; and an offer controller of said at least one server system, responsive to receiving, at said server system, a particular product selection from among said plurality of products by a user selection of one of said plurality of selectable buttons from said particular client system, for downloading, to said particular client system, a first package offer with a selectable option for replacing said first package offer specified for output within a second browser window of said browser, wherein said first package offer comprises the client selected particular product and at least one second product from among at least one vendor selected product at a first price at a first discounted rate for purchase of both the client selected particular product and said at least one second product;

wherein said offer controller, responsive to detecting at said server system, a selection of said selectable option by said user from said particular client system, creates at least one alternative product package offer for purchase of both said client selected particular product and at least one third product from among a different set of vendor selected products; and wherein said offer controller downloads, to said particular client system, said alternative product package offer to said particular client system for selection for purchase by said user specified for output in an additional browser window of said browser separate from said first browser window and said second browser window, such that said user is enabled to select a final product package comprising the client selected particular product and said at least one third product from said different set of vendor selected products at a total price having a final discounted rate.

11. The system according to claim 10 for offering an alternative product package offer, further comprising:

means for detecting said selection by said user of said particular product from at least one of said particular client system communicating said user selecting to view a description of said particular product, said user selecting to purchase said particular product, said user selecting said particular product from an on-line advertisement, and said user entering a search term for said particular product.

12. The system according to claim 10 for offering an alternative product package offer, wherein said offer controller for downloading a first package offer to a particular client system from among said plurality of client systems with a selectable option for replacing said first package offer, further comprises:

means for detecting, at said server system, a request from said particular client system to access said web page, wherein a coding for said web page specifies said first package offer; and means, responsive to detecting said request to access said web page with said coding specifying said first package offer, for automatically creating a selectable option button for said selectable option and dynamically inserting said selectable option button for replacing said first package offer in said coding for said download for said web page with said first package offer to said particular client system.

13. The system according to claim 10 for offering an alternative product package offer, wherein said offer controller for downloading a first package offer to a particular client system from among said plurality of client systems with a selectable option for replacing said first package offer, further comprises:

means, responsive to detecting said particular product selected by said user, for creating said first package offer according to at least one offer rule specifying a selection of products available as said at least one vendor selected product.

14. The system according to claim 10 for offering an alternative product package offer, wherein said offer controller for creating at least one alternative product package offer for purchase of both said client selected particular product and at least one third product from among a different set of vendor selected products, further comprises:
- means, responsive to detecting, at said server system, said selection of said selectable option by said user from said particular client system, for determining said different set of vendor products to offer to said user for selection as said at least one third product;
- means for downloading said different set of vendor products to said particular client system, wherein said user is enabled to select at least one from among said different set of vendor products; and
- means, responsive to detecting, at said server system, at least one alternate product selected by said user from among said different set of vendor products, for creating said alternative product package offer with said alternate product as said third product in said alternative product package offer.

15. The system according to claim 10 for offering an alternative product package offer, wherein said offer controller for creating at least one alternative product package offer for purchase of both said client selected particular product and at least one third product from among a different set of vendor selected products, further comprises:
- means for selecting said third product from among said different set of vendor selected products according to at least one offer rule specifying at least one of a requirement for a price range for said third product and a requirement for a product category for said third product.

16. The system according to claim 10 for offering an alternative product package offer, wherein said offer controller for creating at least one alternative product package offer for purchase of both said client selected particular product and at least one third product from among a different set of vendor selected products, further comprises:
- means for creating said alternative product package offer for purchase of both said particular product and said third product, wherein said particular product is offered by a first web vendor and said third product is offered by a second web vendor and a third web vendor facilitates said alternative product package offer.

17. A program for offering an alternative product package offer comprising a computer readable medium including a computer readable program, wherein the computer readable program when executed on a computer causes the computer to:
- display within a user interface of a particular client system, a first vendor web page within a first browser window of a browser comprising a plurality of selectable buttons, wherein selection of each of said selectable buttons triggers a product selection of a separate product from among a plurality of products;
- respond to receiving a particular product selection from among said plurality of products by a user selection of one of said plurality of selectable buttons from said particular client system;
- download, to said particular client system, a first package offer with a selectable option for replacing said first package offer specified for output within a second browser window of said browser, wherein said first package offer comprises the client selected particular product and at least one second product from among at least one vendor selected product at a first price at a first discounted rate for purchase of both the client selected particular product and said at least one second product;
- detect a selection of said selectable option by said user from said particular client system;
- create at least one alternative product package offer for purchase of both said client selected particular product and at least one third product from among a different set of vendor selected products; and
- download, to said particular client system, said alternative product package offer to said particular client system for selection for purchase by said user specified for output in an additional browser window of said browser separate from said first browser window and said second browser window, wherein said user is enabled to select a final product package comprising the client selected particular product and said at least one third product from said different set of vendor selected products at a total price having a final discounted rate.

18. The program according to claim 17 for offering an alternative product package offer, said computer readable program when executed on a computer further causing the computer to:
- detect said selection of said selectable option by said user from said particular client system;
- determine said different set of vendor products to offer to said user for selection as said at least one third product;
- download said different set of vendor products to said particular client system, wherein said user is enabled to select at least one from among said different set of vendor products;
- detect at least one alternate product selected by said user from among said different set of vendor products; and
- create said alternative product package offer with said alternate product as said third product in said alternative product package offer.

* * * * *